UNITED STATES PATENT OFFICE.

JOSEPH D. BRYANT, OF COLUMBUS, OHIO.

LIQUID WAX-FINISH 987,042.

Specification of Letters Patent.

Patented Mar. 14, 1911.

No Drawing. Original application filed May 10, 1909, Serial No. 495,015. Divided and this application filed August 1, 1910. Serial No. 574,853.

*To all whom it may concern:*

Be it known that I, JOSEPH D. BRYANT, a citizen of the United States, residing at Columbus, in the county of Franklin and State of Ohio, have invented a certain new and useful Improvement in Liquid Wax-Finish, of which the following is a specification.

The object of this invention is to provide an improved compound in liquid form for imparting a wax finish to floors and articles of wood.

The invention is embodied in a compound prepared substantially as hereinafter set forth and claimed.

The compound comprises the following ingredients mixed in the manner and quantities by weight, as stated in the following example, towit: twenty parts of kauri gum; forty nine parts of carnauba wax; thirty one parts of stearic acid and seven times the combined weights of these of turpentine.

The above ingredients are mixed as follows: The kauri gum is first reduced to a liquid state by heat in a kettle and then the wax and stearic acid added. The heat of the gum dissolves the wax. After this the turpentine is added while the mixture is at a temperature of about one hundred and fifty degrees Fahrenheit. The materials may be stirred, if desired, to effect the more rapid solution and mixing. The proportions of the ingredients and the manner of compounding them can be varied, but I have found that those indicated produce very satisfactory results. The turpentine serves to keep the ingredients in liquid form in ordinary temperatures. The gum imparts hardness and durability to the compound and aids in overcoming the tacky property imparted by a preponderance of wax and the stearic acid according to my observation, experience and understanding assists in preventing the wax from granulating or crystallizing and settling in the container. Stearic acid also as I believe promotes quick hard drying.

The compound is quite thin and fluent and can be applied with an ordinary cotton waste or a soft cloth; and because the compound dries in a few minutes it can be promptly rubbed down to obtain the polish. Several coats can be applied, but it is the better practice to allow an interval of at least four or five hours for thorough hardening between the application of coats.

The application for this patent was a division of that filed by me on May 10, 1909, and having Serial Number 495,015.

What I claim is:

A liquid wax finish compound consisting of the following ingredients in approximately the following proportions by weight, towit: twenty parts of kauri gum, forty nine parts of carnauba wax, thirty one parts of stearic acid and seven times their combined weight of turpentine, substantially as described.

JOSEPH D. BRYANT.

Witnesses:
CHAS. S. DRUGGAN,
GERTRUDE LOWRY.